United States Patent
Sato et al.

[11] Patent Number: 6,045,704
[45] Date of Patent: Apr. 4, 2000

[54] WATER PURIFICATION SYSTEM AND METHOD HAVING A CHLORINE GENERATING FUNCTION IN ADDITION TO A BACTERIOSTATIC FUNCTION

[75] Inventors: Motoharu Sato, Honjo; Kazushige Watanabe, Maebashi; Takaaki Suga, Gunma, all of Japan

[73] Assignee: Sanden Corporation, Japan

[21] Appl. No.: 08/964,412

[22] Filed: Nov. 4, 1997

[30] Foreign Application Priority Data

Nov. 5, 1996 [JP] Japan ................... 8-292890
Nov. 5, 1996 [JP] Japan ................... 8-292909

[51] Int. Cl.$^7$ ................... C02F 1/28
[52] U.S. Cl. ................... 210/694; 204/276; 205/751; 205/754; 205/760; 210/748; 210/754; 210/96.1; 210/138; 210/143; 210/243
[58] Field of Search ................... 204/228, 231, 204/276, 229.9; 205/751, 754, 760; 210/748, 754, 96.1, 138, 143, 192, 209, 243, 266, 694

[56] References Cited

U.S. PATENT DOCUMENTS 3,701,728  10/1972  Appleman ................... 210/209
4,361,471  11/1982  Kosarek ................... 210/754
5,085,743   2/1992  Reddy et al. ................... 205/105

*Primary Examiner*—Ivars Cintins
*Attorney, Agent, or Firm*—Banner & Witcoff, Ltd.

[57] ABSTRACT

In a water purification system for purifying raw water with a first d.c. voltage is applied between a conductive adsorber portion (20) and a primary electrode (27) in the raw water, a second d.c. voltage higher than the first d.c. voltage is applied in place of the first d.c. voltage at intervals between the adsorber portion and the primary electrode to accelerate generation of chlorine from the raw water. The primary electrode is opposite to the adsorber portion with a particular space left therebetween. It is preferable that the adsorber portion is provided with a supplementary electrode (29) which is opposite to the primary electrode so that the particular space is left therebetween.

17 Claims, 12 Drawing Sheets

WATER PURIFICATION SYSTEM AND METHOD HAVING A CHLORINE GENERATING FUNCTION IN ADDITION TO A BACTERIOSTATIC FUNCTION

BACKGROUND OF THE INVENTION

This invention relates to a water purification system and method for purifying raw water such as tap water and groundwater to provide drinking water for domestic or business use.

In a water purification system of the type, sterilization of raw water is carried out in various manners. As a recent technical trend, use has widely been made of a hollow fiber membrane module (commercially available) for destroying microorganisms and bacteria and suppressing growth or propagation thereof. Use is also made of a unit for carrying out electrolysis of the raw water and/or another unit for generating an appropriate amount of chlorine.

Generally, the raw water such as tap water and groundwater contains various pollutants, namely, residual chlorine such as hypochlorous acid ($HClO^-$), musty odor, trihalomethane, chlorinated organic compounds, pigments, and so on. In the water purification system as a water treatment system, the raw water is made to pass through an adsorber portion (typically, activated carbon) to adsorb and remove the above-mentioned pollutants as adsorbed substances. Thus, the raw water is purified through the adsorber portion to be supplied as purified water. This mode of operation will be referred to as a purification mode throughout the present specification.

In the purification mode, the purified water is supplied in response to a water supply request signal which is produced when a tap is opened. While the supply of the purified water is stopped in absence of the water supply request signal, various kinds of the microorganisms and the bacteria may be grown in the adsorber portion because the flow of the raw water is interrupted. In order to suppress such growth of the microorganisms and the bacteria, the purification mode includes a bacteriostatic operation of applying a weak d.c. voltage to the adsorber portion.

With the lapse of time, the adsorber portion will suffer an accumulation of the adsorbed substances and the growth of the microorganisms and the bacteria. In order to remove the adsorbed substances as well as the microorganisms and the bacteria, the purification mode is followed by a reproduction mode in which the adsorber portion is applied with an a.c. voltage to desorb the adsorbed substances and to destroy and desorb the microorganisms and the bacteria.

In the conventional water purification system described above, tap water typically used as the raw water is made to pass through the adsorber portion to be purified. However, simultaneously when the tap water is purified in the adsorber portion, an effective chlorine component contained in the tap water is also removed. This results in easy growth of the microorganisms and the bacteria in a pipe downstream of the water purification system. In this event, the microorganisms and the bacteria may be mixed into the purified water supplied from the water purification system.

In order to avoid the above-mentioned problem, a chlorine generator is arranged downstream of the water purification system. The chlorine generator is for producing chlorine to compensate the effective chlorine component removed by the adsorber portion.

However, use of the chlorine generator in addition to the water purification system not only requires an additional space for installation thereof but also an additional cost.

SUMMARY OF THE INVENTION

It is therefore an object of this invention to provide a water purification system having a chlorine generating function in addition to a bacteriostatic function.

Other objects of this invention will become clear as the description proceeds.

A water purification system to which this invention is applicable is for purifying raw water. The water purification system comprising a conductive adsorber portion placed in a flow of the raw water, a primary electrode opposite to the conductive adsorber portion in the flow of the raw water with a particular space left therebetween, first voltage applying means connected to the conductive adsorber portion and the primary electrode for applying a first d.c. voltage between the conductive adsorber portion and the primary electrode so that the conductive adsorber portion and the primary electrode act as an anode and a cathode, respectively, the first d.c. voltage making the conductive adsorber portion purify the raw water, and second voltage applying means connected to the conductive adsorber portion and the primary electrode for applying a second d.c. voltage between the conductive adsorber portion and the primary electrode, the second d.c. voltage being higher than the first d.c. voltage to accelerate generation of chlorine from the raw water.

DESCRIPTION OF THE PREFERRED EMBODIMENTS

Now, description will be made as regards a few preferred embodiments of this invention with reference to the drawings.

Figure 1:
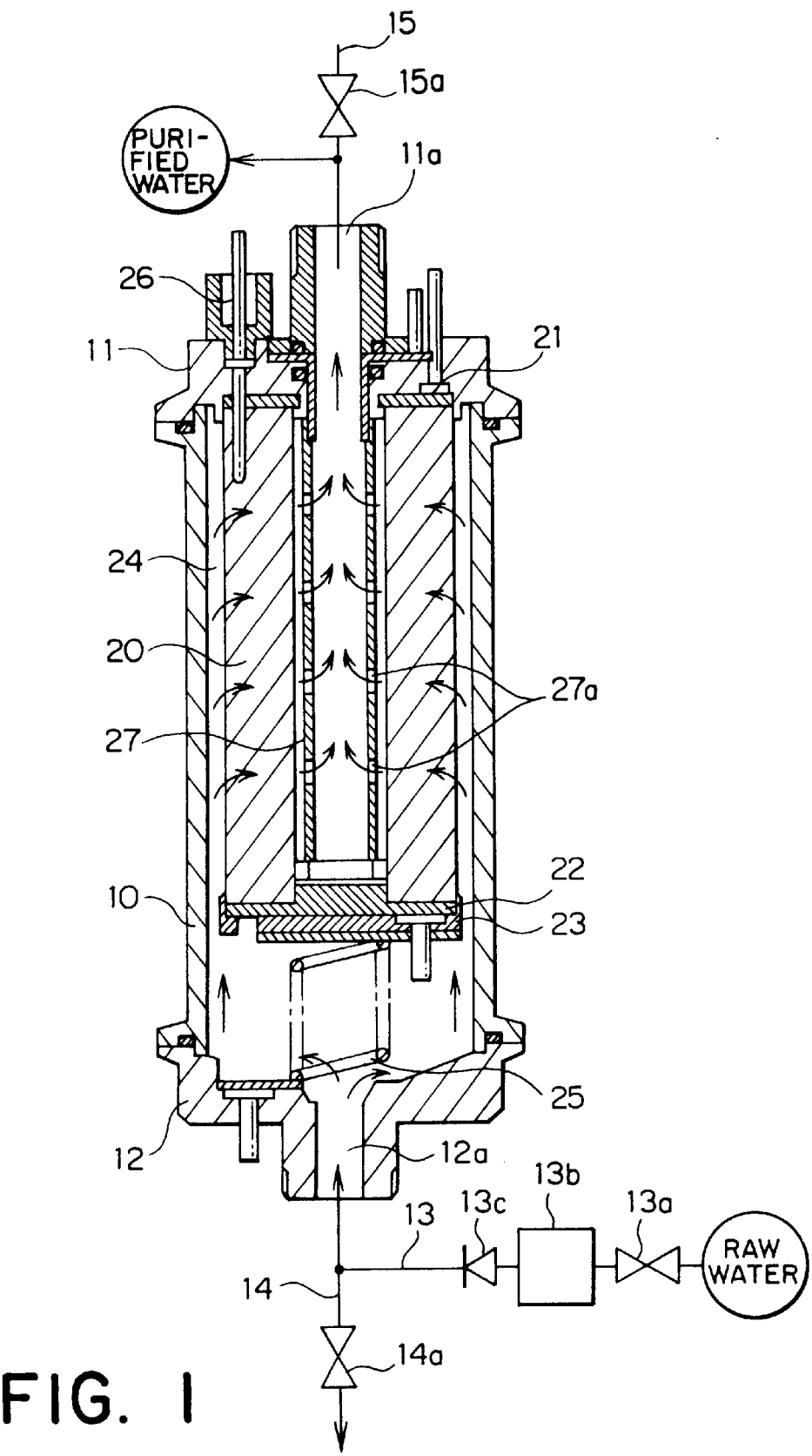
FIG. 1 is a sectional view of a water purification system according to a first embodiment of this invention.

At first referring to FIG. 1, a water purification system according to a first embodiment of this invention is for carrying out purification of raw water and comprises a cylindrical water tank 10 for storing the raw water. The water tank 10 has upper and lower ends closed by upper and lower caps 11 and 12, respectively. Each of the water tank 10, and the upper and the lower caps 11 and 12 is made of an electrical insulating material, for example, polypropylene resin. The upper cap 11 is provided with an outlet port 11a communicating with a tap (not shown) which is for supplying purified water in the manner known in the art. The lower cap 12 is provided with an inlet port 12a for introducing the raw water into the water tank 10. The inlet port 12a is connected to a water supply pipe 13 with a water supply valve 13a, a prefilter 13b, and a check valve 13c. The water supply valve 13a is for allowing and inhibiting passage of the raw water. The check valve 13c serves to prevent backflow from the water tank 10. The inlet port 12a is also connected to a discharge pipe 14 with a discharge valve 14a.

On the other hand, the outlet port 11a is connected to an air introduction pipe 15 with an air introduction valve 15a. When the discharge valve 14a and the air introduction valve 15a are closed with the water supply valve 13a opened, the raw water is supplied into the water tank 10. On the contrary, when the discharge valve 14a and the air introduction valve 15a are opened with the water supply valve 13a closed, the raw water is discharged from the water tank 10.

The water purification system comprises an adsorber portion 20 formed in a cylindrical shape by activated carbon fiber having conductivity. The cylindrical adsorber portion 20 is placed in the water tank 10. The adsorber portion 20 has an upper axial end held by the upper cap 11 through a first electrode 21 of a flat shape and a lower axial end held by a holder 23 through a second electrode 22 of a flat shape. The lower axial end of the adsorber portion 20 is referred to as a particular portion.

The holder 23 is made of an electrical insulating material, for example, polyphenylene resin. An annular path 24 is defined between an outer surface of the adsorber portion 20 and an inner surface of the water tank 10 to communicate with the inlet port 12a. Within the water tank 10, the raw water introduced via the inlet port 12a flows into the adsorber portion 20 through the path 24. A conductive coil spring 25 is interposed between the lower end of the adsorber portion 20 and the lower cap 12. The coil spring 25 serves to urge the adsorber portion 20 towards the upper cap 11 so that the adsorber portion 20 is fixedly held in the water tank 10. The adsorber portion 20 is provided with a temperature sensor 26 for detecting a temperature of the adsorber portion 20.

In the adsorber portion 20 of the above-mentioned structure, an outflow pipe 27 extends in a vertical direction with a predetermined gap or space from an inner peripheral surface of the adsorber portion 20. In this event, the inner peripheral surface of the adsorber portion 20 is referred to as a specific portion.

The outflow pipe 27 has a number of water passage holes 27a for leading the purified water passing through the adsorber portion 20 to the outlet port 11a. The outflow pipe 27 is formed by a conductive material and will be called hereinafter a third electrode which is referred to as a primary electrode. The conductive material of the third electrode 27 comprises a titanium base coated with a selected one of platinum, a combination of platinum and iridium, carbon, and carbon-mixed resin and has a small chlorine overvoltage.

As described above, the water purification system of FIG. 1 has the first, the second, and the third electrodes 21, 22, and 27. In a bacteriostatic operation during a purification mode which will later be described, the adsorber portion 20 impregnated with the raw water is applied with a d.c. voltage through the second and the third electrodes 22 and 27 to suppress growth of microorganisms and bacteria. On the other hand, in a reproduction mode following the purification mode, the adsorber portion 20 is applied with an a.c. voltage through the first and the second electrodes 21 and 22 to desorb adsorbed substances including trihalomethane and various organic compounds and to destroy the microorganisms and the bacteria. The purification mode and the reproduction mode are alternately carried out at predetermined intervals.

Figure 2:
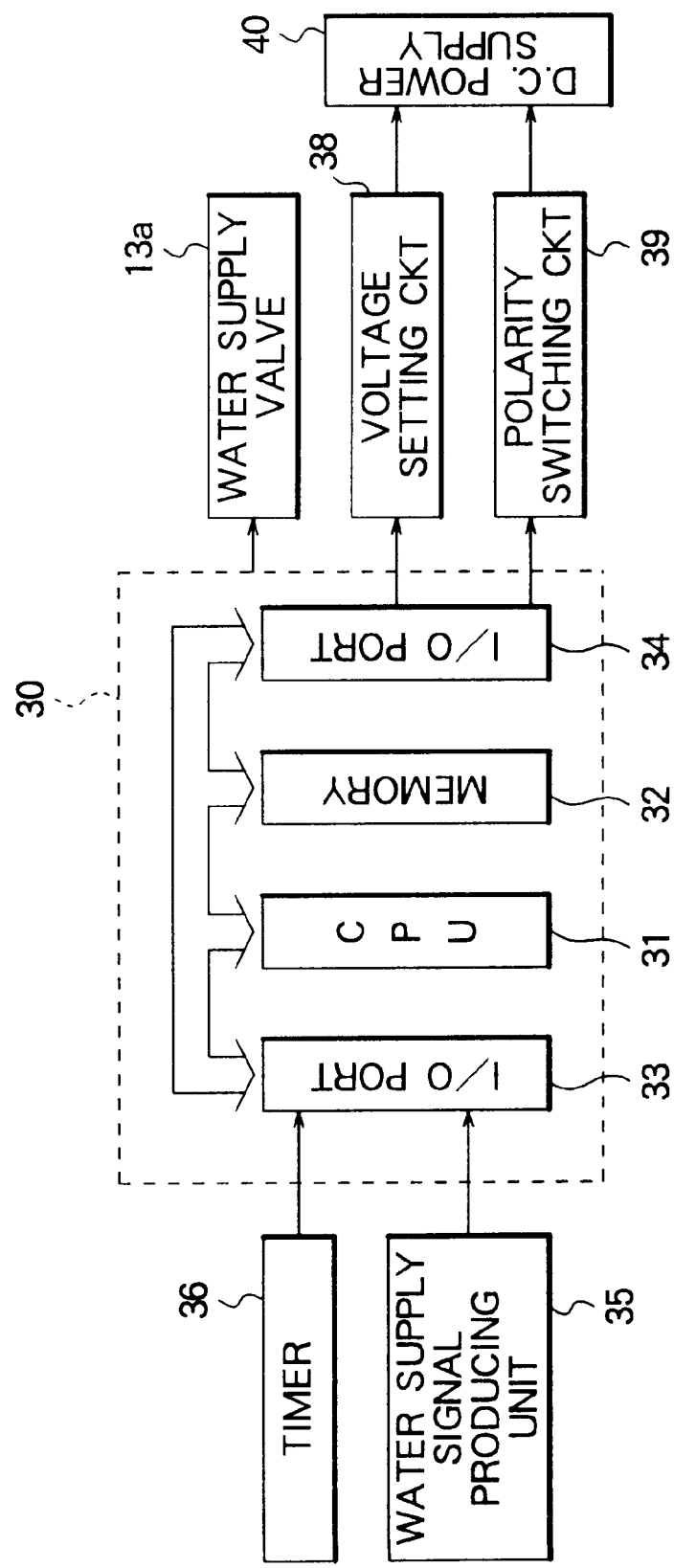
FIG. 2 is a block diagram of a control section of the water purification system illustrated in FIG. 1.

Next referring to FIG. 2, the description will be directed to a control section of the water purification system. In the following description, the bacteriostatic operation in the purification mode will be described as a characteristic part of this invention.

The water purification system according to this embodiment further comprises a control unit 30 implemented by a microcomputer and is automatically operated. The control unit 30 comprises a central processing unit (CPU) 31 and a memory 32 storing a control program. The control unit 30 has I/O ports 33 and 34 for input of signals from a water supply signal producing unit 35 and a timer 36 and for output of signals to the water supply valve 13a, a voltage setting circuit 38, and a polarity switching circuit 39. The water supply signal producing unit 35 is for producing a valve open signal or a water supply signal in response to opening of the water supply valve 13a. The timer 36 produces various time signals. Responsive to the valve open signal and the time signals, the control unit 30 controls the voltage setting circuit 38 and the polarity switching circuit 39. The voltage setting circuit 38 and the polarity switching circuit 39 are connected to a d.c. power supply 40 to make the d.c. power supply 40 generate the d.c. voltage of a selected level and a selected polarity. In addition, the control unit 30 serves to control the water supply valve 13a in the manner known in the art.

The timer 36 is connected to the control unit 30 and is for determining a first and a second time duration in a particular time duration when the flow of the raw water is interrupted. More particularly, the timer 36 sets an interval time for alternation of the purification mode (including the bacteriostatic operation) and the reproduction mode, and a polarity switching time (as a preselected standard-polarity voltage application time or the first time duration and a preselected reverse-polarity voltage application time or the second time duration) for switching of the polarity of each of the second and the third electrodes 22 and 27 through the polarity switching circuit 39 and the d.c. power supply 40.

The voltage setting circuit 38 is connected to the control unit 30 and is for setting a first d.c. voltage EA1 and a second d.c. voltage EA2 at two different levels. The first d.c. voltage EA1 has a low level sufficient to capture the microorganisms and the bacteria, for example, 3 V. On the other hand, the second d.c. voltage EA2 has a relatively high level capable of performing electrolysis of the raw water to generate chlorine, for example, 12 V.

The polarity switching circuit 39 is connected to the control unit 30 and is for switching a polarity of the d.c. voltage between a standard polarity in which the second and the third electrodes 22 and 27 act as an anode and a cathode, respectively, and a reverse polarity in which the second and the third electrodes 22 and 27 act as the cathode and the anode, respectively.

The d.c. power supply 40 is connected to the second and the third electrodes 22 and 27 and is for applying the d.c. voltage between the second and the third electrodes 22 and 27.

Figure 3:
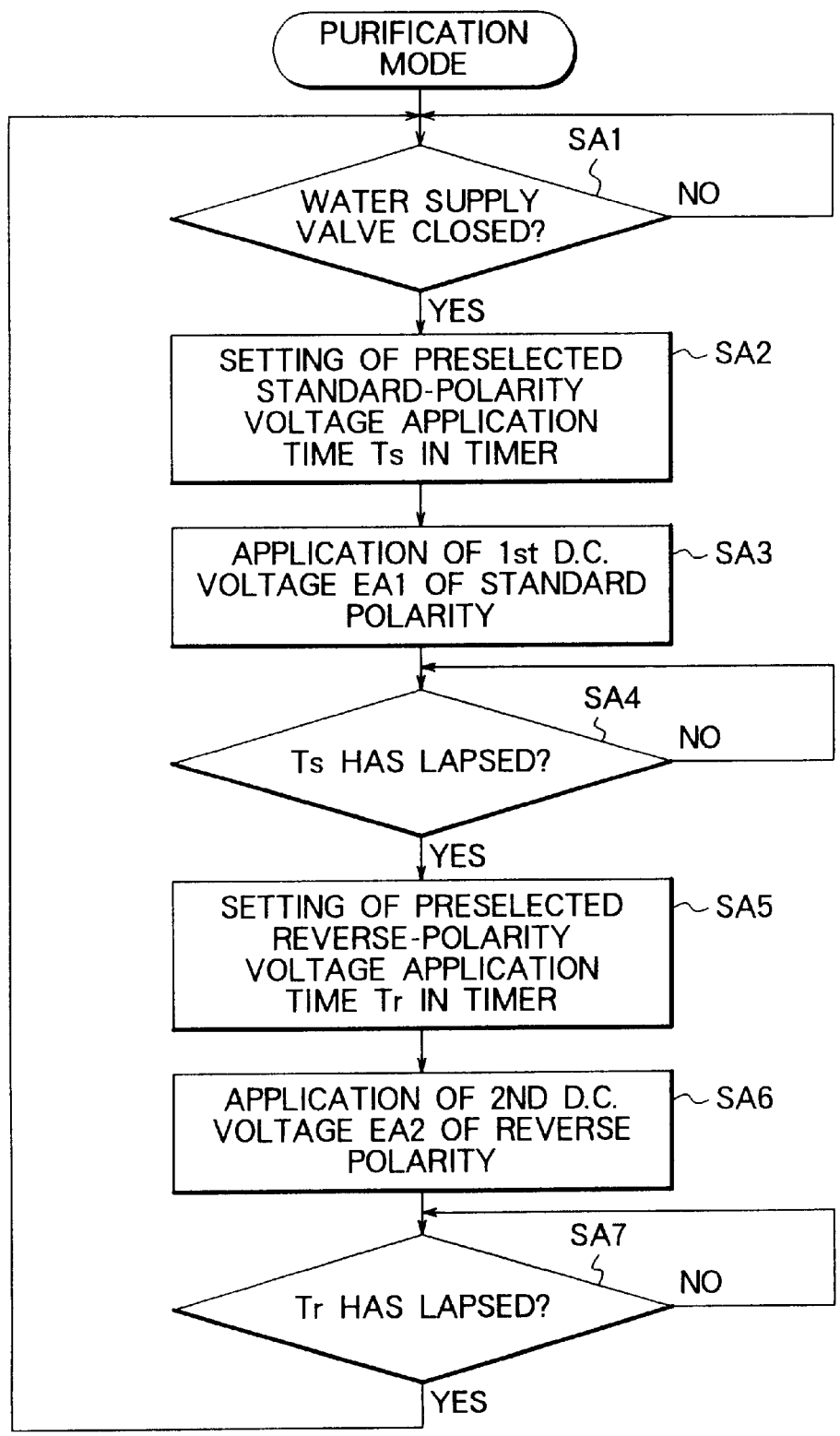
FIG. 3 is a flow chart for describing a control operation of the water purification system illustrated in FIG. 1.
Figure 4:
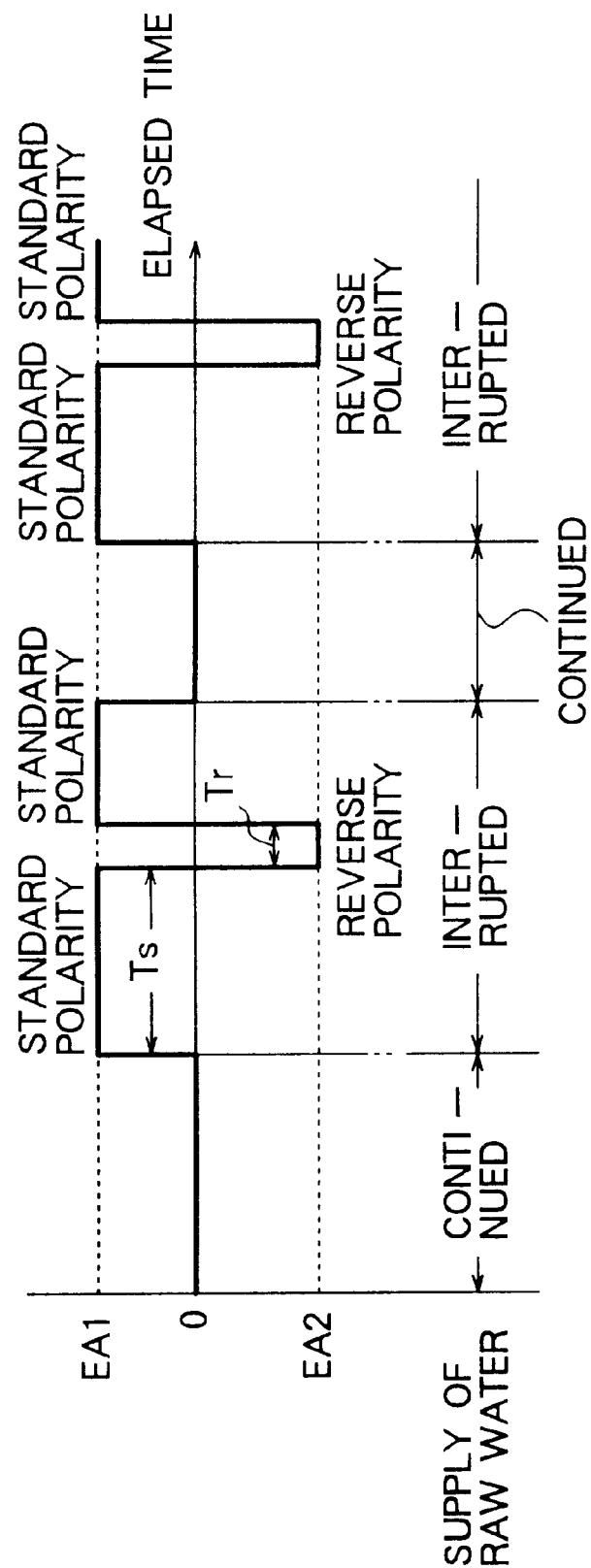
FIG. 4 is a time chart for describing the control operation illustrated in FIG. 3.

Now, the description will be made as regards operation of the control section in the bacteriostatic operation. Referring to FIGS. 3 and 4, it will be assumed that the water purification system is operated in the purification mode. A supply of the raw water is controlled for alternation of a continued condition and an interrupted condition in the manner which is labelled in a lowest line of FIG. 4.

In a step SA1, the control unit 30 judges with reference to presence and absence of the valve open signal about whether or not the water supply valve 13a is closed. When the water supply valve 13a is closed, the water supply signal producing unit 35 produces a water supply signal or a particular signal. The control unit 30 controls operation of each of the voltage setting circuit 38 and the d.c. power supply 40 in response to the particular signal. In this event, the water supply signal producing unit 35 will be referred to as a signal producing arrangement. The control unit 30 may control operation of the polarity switching circuit 39 in response to the particular signal.

At any rate, the water purification system starts the bacteriostatic operation when the water supply valve 13a is closed. The step SA1 proceeds to a step SA2. In the step SA2, the preselected standard-polarity voltage application time Ts is set in the timer 36. The step SA2 is followed by a step SA3 at which the control unit 30 energizes the d.c. power supply 40 through the voltage setting circuit 38. As a result, the first d.c. voltage EA1 is applied between the second and the third electrodes 22 and 27 so that the second and the third electrodes 22 and 27 act as the anode and the cathode, respectively. Thus, the microorganisms and the bacteria carrying weak negative ions are captured in the adsorber portion 20. In addition, the growth of the microorganisms and the bacteria at the adsorber portion 20 is suppressed. In this event, a combination of the voltage setting circuit 38 and the d.c. power supply 40 is referred to as a first voltage applying arrangement. On carrying out the step SA3, the control unit 30 will be referred to as a first energizing arrangement.

In a step SA4 following the step SA3, judgement is made about whether or not the preselected standard-polarity voltage application time Ts has lapsed. When the preselected standard-polarity voltage application time Ts has lapsed, the step SA4 proceeds to a step SA5. In the step SA5, the polarity switching circuit 39 determines the polarity of the second d.c. voltage EA2 so that the second electrode 22 and the third electrode 27 act as the cathode and the anode, respectively. In addition, the preselected reverse-polarity voltage application time Tr is set in the timer 36. The step SA5 is followed by a step SA6 at which the control circuit 40 energizes the d.c. power supply 40 through the voltage setting cicuit 38. As a result, the second d.c. voltage EA2 is applied between the second and the third electrodes 22 and 27 so that the second and the third electrodes 22 and 27 act as the cathode and the anode, respectively. In this event, a combination of the voltage setting circuit 38 and the d.c. power supply 40 is referred to as a second voltage applying arrangement. On carrying out the step SA5, the polarity switching circuit 39 will be referred to as a polarity determining arrangement. Also on carrying out the step SA5, the control circuit 30 will be referred to as a second energizing arrangement. A combination of the first and the second energizing arrangements will be called an energizing arrangement.

By application of the second d.c. voltage EA2 of the reverse polarity, chlorine (hypochlorous acid ($HClO^-$)) is generated from chlorine ions in the raw water at the side of the third electrode 27 to increase a chlorine concentration.

Since the third electrode 27 is formed by the material having a small chlorine overvoltage as described above, chlorine is efficiently generated from the chlorine ions.

The step SA6 is followed by a step SA7 at which judgement is made about whether or not the preselected reverse-polarity voltage application time Tr has lapsed. When the preselected reverse-polarity voltage application time Tr has lapsed, the step SA7 returns to the step SA1.

Figure 5:
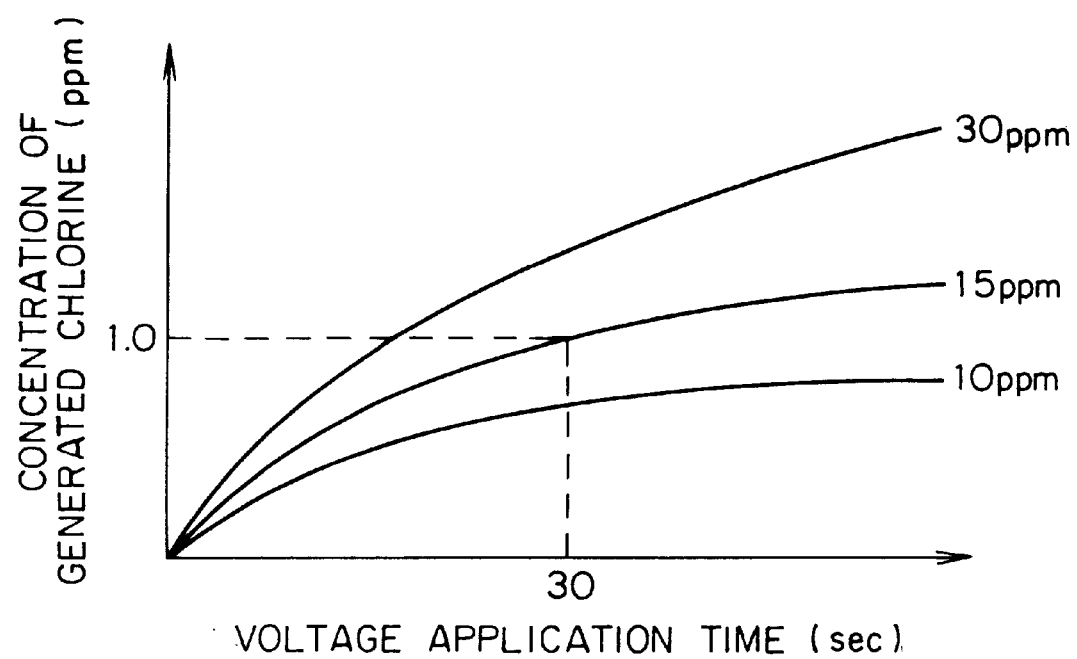
FIG. 5 is a graph showing resultant chlorine concentrations with respect to different chlorine ion concentrations in tap water as raw water.

Turning to FIG. 5, variation of the chlorine concentration will be described. It is assumed here that the raw water has a chlorine ion concentration of 15 ppm and that a voltage application time is equal to 30 seconds. In this event, the chlorine concentration of about 1.0 ppm is obtained. It will be understood from the figure that, when the raw water has the chlorine ion concentration as high as 30 ppm, the chlorine concentration of about 1.0 ppm can be obtained in a shorter voltage application time. On the contrary, when the raw water has the chlorine ion concentration as low as 10 ppm, a longer voltage application time is required. Therefore, the preselected reverse-polarity voltage application time Tr is determined in dependence upon the quality (chlorine ion concentration) of the raw water.

In the water purification system of this embodiment, the first d.c. voltage EA1 of the standard polarity and the second d.c. voltage EA2 of the reverse polarity are applied through the second and the third electrodes 22 and 27 while the water supply valve 13a is closed. Thus, in addition to the bacteriostatic function in the prior art, a chlorine generating function is exhibited to increase the chlorine concentration. Therefore, no additional chlorine generator is required.

Although the second d.c. voltage EA2 is controlled to have a high voltage value kept constant, for example, at 12 V in this embodiment, it is applied between the first and the third electrodes 21 and 27 to have a current value controllably kept constant, for example, at 0.4 A.

Figure 6:
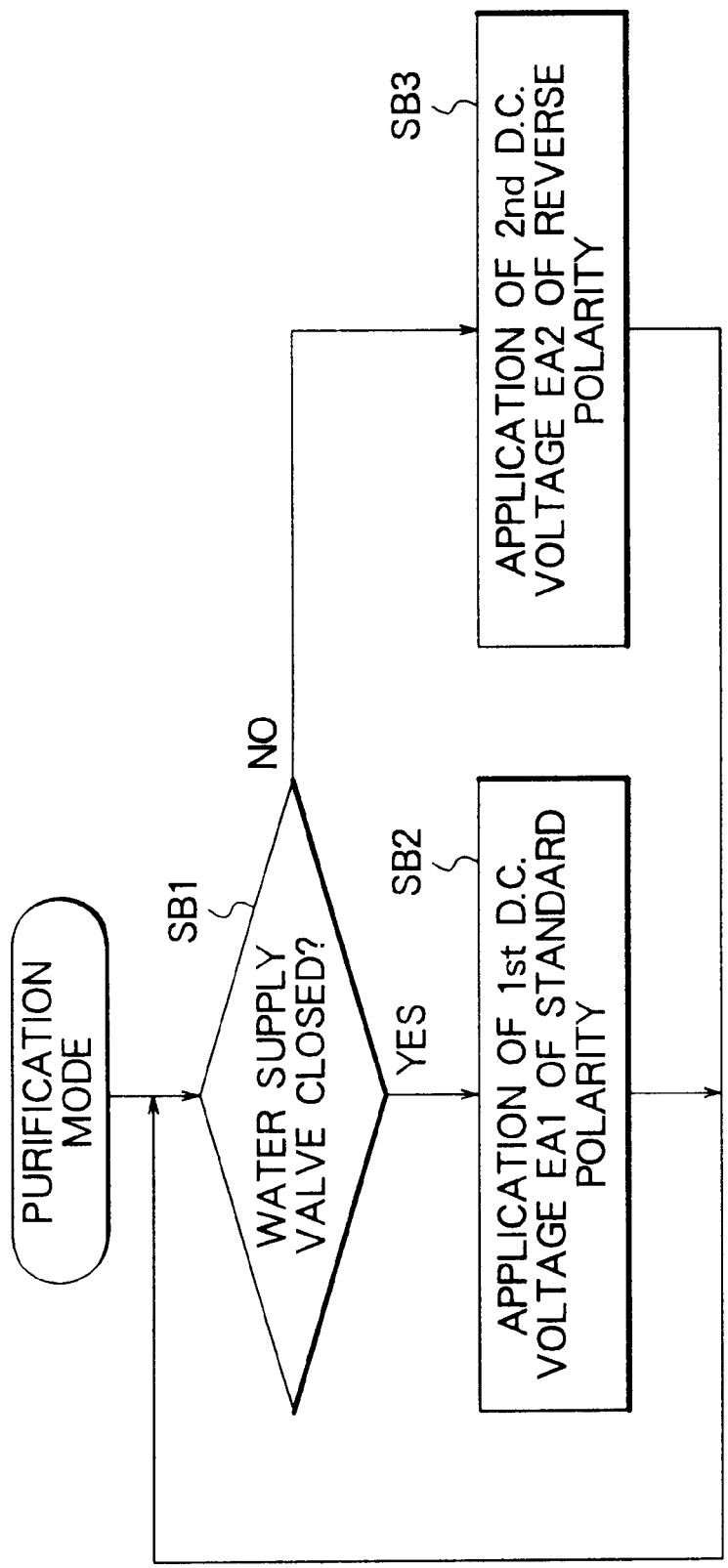
FIG. 6 is a flow chart for describing a control operation of a water purification system according to a second embodiment of this invention.
Figure 7:
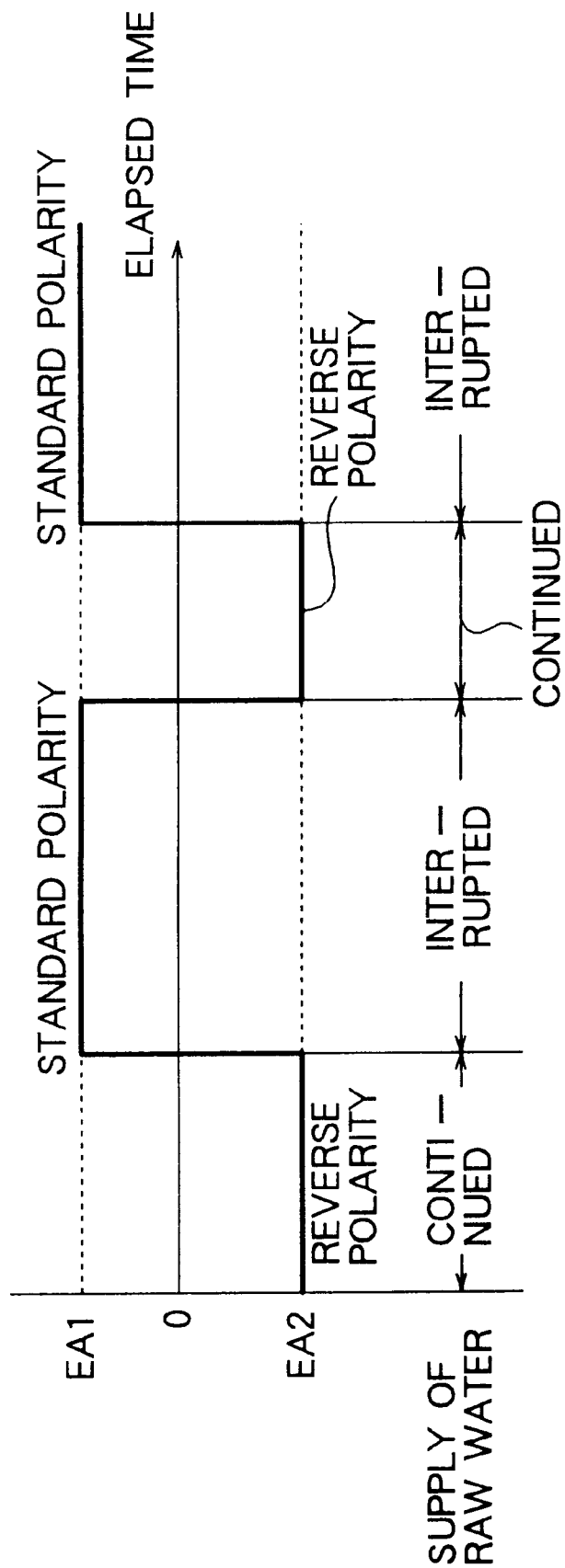
FIG. 7 is a time chart for describing the control operation illustrated in FIG. 6.

Referring to FIGS. 6 and 7, the description will be made as regards a water purification system according to a second embodiment of this invention. The water purification system has a structure which is similar to that of the water purification system illustrated in FIGS. 1 and 2. Therefore, the description will be mainly directed to operation of the water purification system in the following description.

In a first step SB1, judgement is made about whether or not the water supply valve 13a is closed in the purification mode. If the water supply valve 13a is closed, the step SB1 proceeds to a step SB2 to apply the first voltage EA1 of the standard polarity to the first and the second electrodes 22 and 27. If the water supply valve 13a is opened, i.e., if the purified water is produced and supplied to the tap, the step SB1 proceeds to a step SB3 to apply the second voltage EA2 of the reverse polarity.

In the second embodiment, the bacteriostatic function and the chlorine generating function are exhibited when the supply of the raw water is interrupted and continued, respectively. The other operation are similar to those described in the first embodiment.

Figure 8:
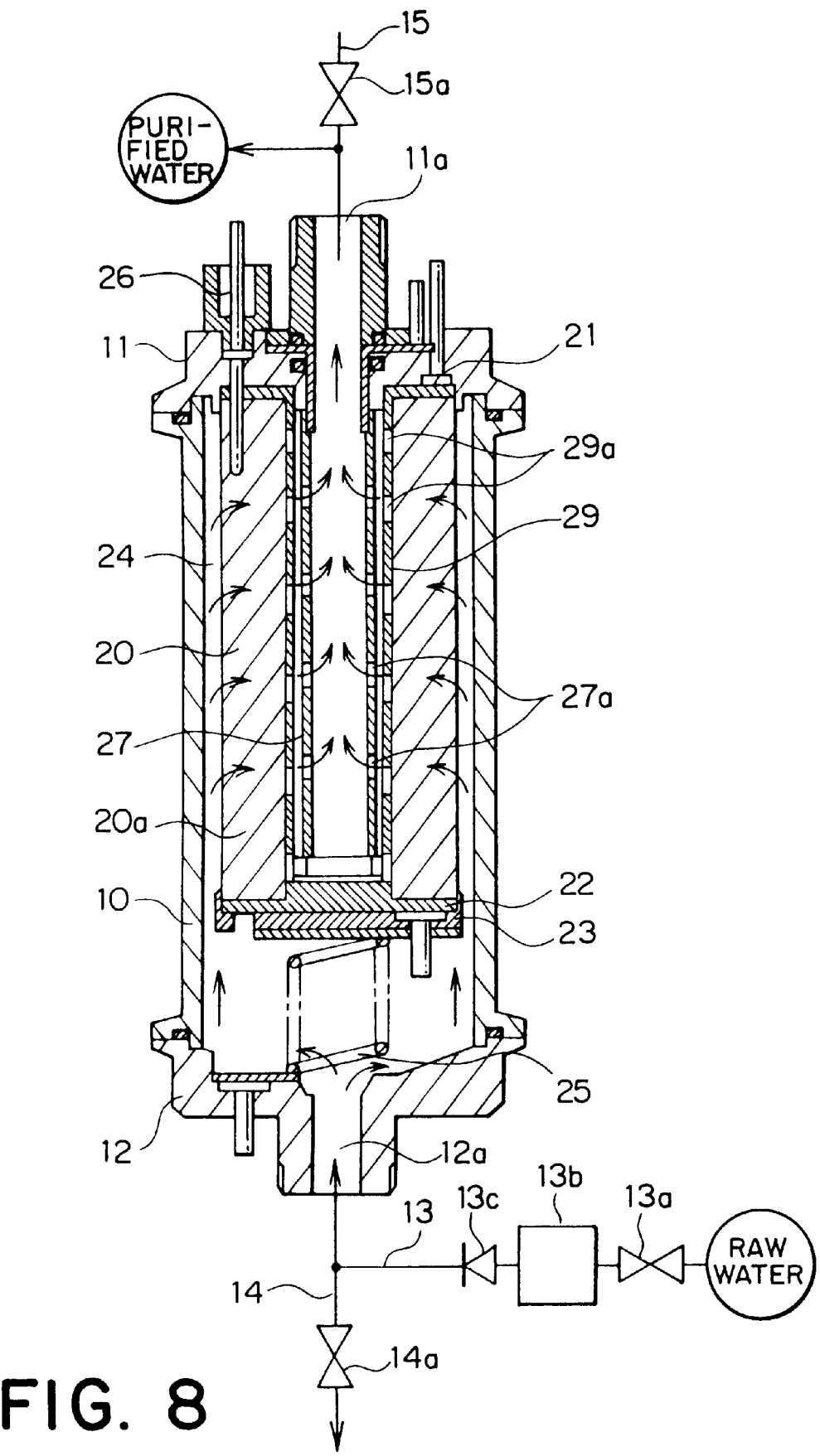
FIG. 8 is a sectional view of a water purification system according to a third embodiment of this invention.

Referring to FIG. 8, the description will be made as regards a water purification system according to a third embodiment of this invention. Similar parts are designated by like reference numerals and will not be described any longer.

As will become clear from FIG. 8, the adsorber portion 20 has an inner peripheral surface extending between the axial ends and defining a hollow space extending in the vertical direction. The first and the second electrodes 21 and 22 are placed on the axial ends of the adsorber portion 20, respectively. The third electrode 27 is placed as the primary electrode in the hollow space of the adsorber portion 20 to have a space left therebetween.

In the water purification system of the third embodiment, the adsorber portion 20 comprises an activated carbon fiber portion 20a and a fourth electrode 29. The activated carbon fiber portion 20a is formed in a cylindrical shape by activated carbon fiber having conductivity and has axial ends opposite to each other and an inner peripheral surface extending between the axial ends and defining a hollow space. The fourth electrode 29 is placed in the hollow space of the activated carbon fiber portion 20a to be in close contact with the inner peripheral surface of the activated carbon fiber portion 20a. The fourth electrode 29 is integrally connected to an inner surface of the first electrode 21 and is inserted in the hollow space of the activated carbon fiber portion 20a to face the third electrode 27 with a space kept therefrom. Thus, the fourth electrode 29 is arranged between the inner surface of the activated carbon fiber portion 20a and the third electrode 27.

Figure 9:
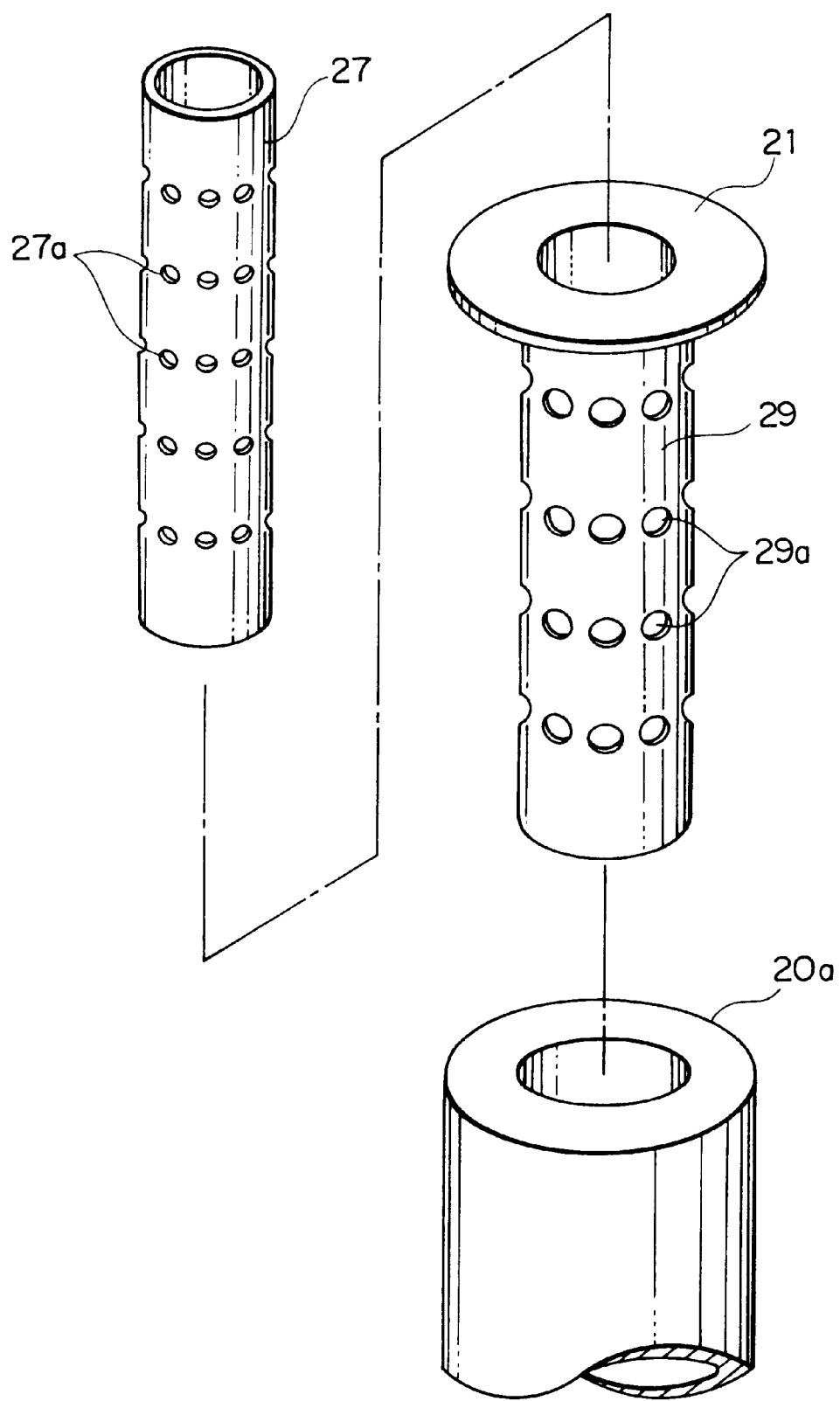
FIG. 9 is an exploded perspective view showing an assembly of electrodes in the water purification system illustrated in FIG. 8.

Referring to FIG. 9 in addition, the fourth electrode 29 has a number of water passage holes 29a formed on its peripheral side wall. The purified water passing through the active carbon fiber portion 20a flows through the water passage holes 29a of the fourth electrode 29 towards the third electrode 27. The fourth electrode 29 is referred to as a supplementary electrode.

Like the first, the second, and the third electrodes 21, 22, and 27, the fourth electrode 29 is made of a conductive material comprising a titanium base coated with a selected one of platinum, a combination of platinum and iridium, carbon, and carbon-mixed resin and has a small chlorine overvoltage.

In the bacteriostatic operation during the purification mode, the adsorber portion 20 impregnated with the raw water is applied with the d.c. voltage through the first electrode 21 (and the fourth electrode 29) and the third electrode 27 to suppress the growth of the microorganisms and the bacteria as will later be described in detail. On the other hand, in the reproduction mode following the purification mode, the adsorber portion 20 is applied with the a.c. voltage through the first electrode 21 (and the fourth electrode 29) and the second electrode 22 to desorb the adsorbed substances including trihalomethane and the various organic compounds and to destroy the microorganisms and the bacteria. As described in the first embodiment, the purification mode and the reproduction mode are alternately carried out at the predetermined intervals.

The water purification system of the third embodiment has the control section 30 similar in structure to that illustrated in FIG. 2 in conjunction with the first embodiment. In the following description, the bacteriostatic operation and the chlorine generating operation in the purification mode will be described as characteristic parts.

The timer 36 sets, in addition to the interval time for alternation of the purification mode and a reproduction mode, the preselected voltage application time Tv and a chlorine generation interval Tc. In the manner which will far later become clear, the generation of chlorine is accelerated at the chlorine generation interval Tc in the water purification system of the third embodiment.

The voltage setting circuit 38 is for setting the first d.c. voltage EA1, the second d.c. voltage EA2, and a third d.c. voltage EA3 through the d.c. power supply 40 between the first and the third electrodes 21 and 27. The first d.c. voltage EA1 has the low level sufficient to capture the microorganisms and the bacteria, for example, 3 V. On the other hand, each of the second and the third d.c. voltages EA2 and EA3 has the relatively high level capable of performing electrolysis of the raw water to generate chlorine, for example, 12 V. Each of the first and the third d.c. voltages EA1 and EA3 is of the standard polarity. The second d.c. voltage EA2 is of the reverse polarity.

The water supply signal producing unit 35 is for producing the valve open signal when the water supply valve 13a is opened. The water supply signal is supplied to the control unit 30. The CPU 31 counts the number of times of the chlorine generating operation.

Figure 10:
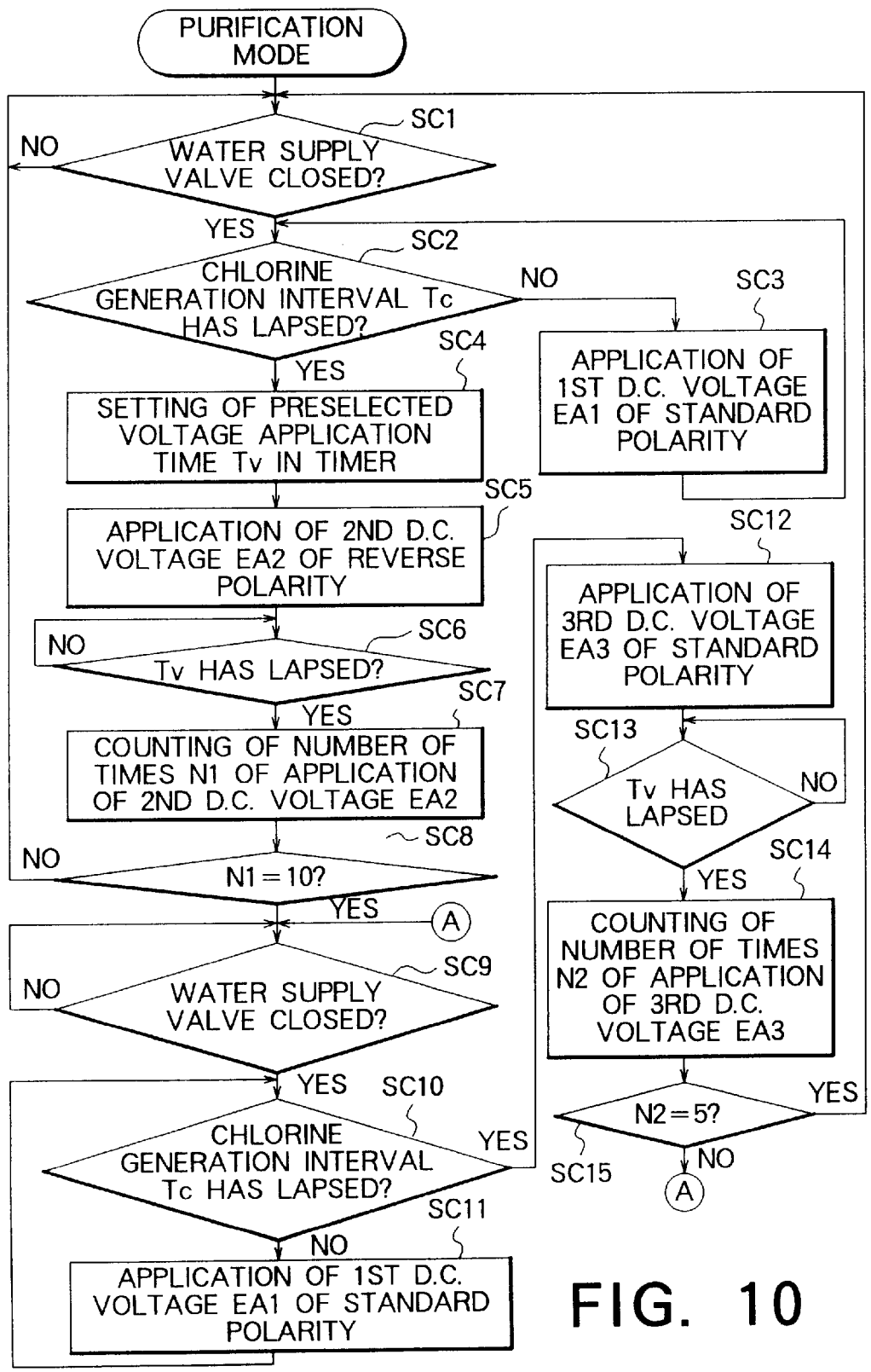
FIG. 10 is a flow chart for describing a control operation of the water purification system illustrated in FIG. 8.
Figure 11:
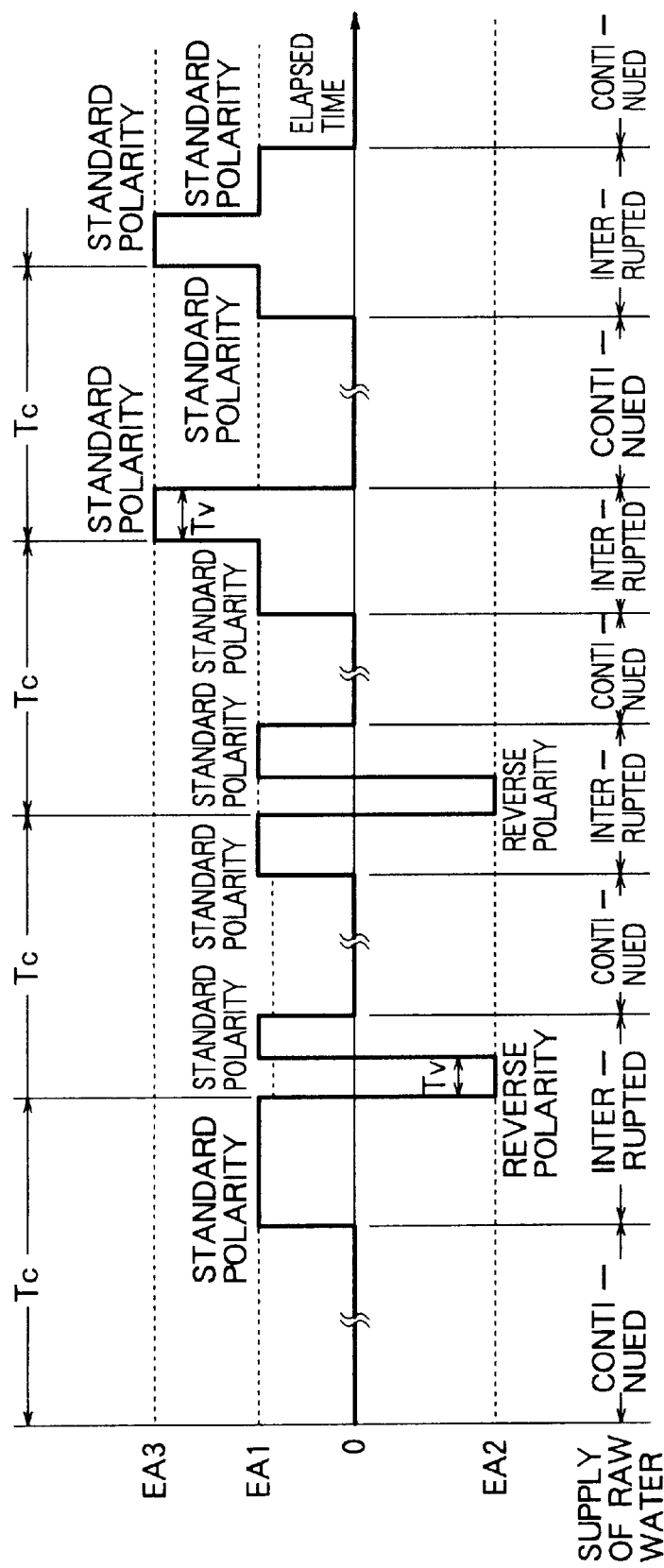
FIG. 11 is a time chart for describing the control operation illustrated in FIG. 10.

Referring to FIGS. 10 and 11 together with FIG. 2, the description will be directed to operation of the control section in the bacteriostatic operation. Application of each of the first, the second, and the third voltages EA1, EA2, and EA3 is interrupted during the continued condition of the supply of the raw water. It will be assumed that the water purification system is operated in the purification mode. In a step SC1, judgement is made with reference to presence and absence of the valve open signal about whether or not the water supply valve 13a is closed. When the water supply valve 13a is closed, the step SC1 proceeds to a step SC2. In the step SC2, judgement is made about whether or not the chlorine generation interval Tc has lapsed from the start of operation in the purification mode. If the chlorine generation interval Tc has not yet lapsed, the step SC2 proceeds to a step SC3 in which the first d.c. voltage EA1 of the standard polarity is applied between the first and the third electrodes 21 and 27. It is noted here that the standard polarity refers to a polarity with the first and the third electrodes 21 and 27 acting as the anode and the cathode, respectively. Thus, the microorganisms and the bacteria carrying the weak negative ions are captured in the adsorber portion 20. In addition, the growth of the microorganisms and the bacteria in the adsorber portion 20 is suppressed. Thus, the bacteriostatic operation is performed. On carrying out the step SC3, a combination of the voltage setting circuit 38, the polarity switching circuit 39, and the d.c. power supply 40 is referred to as the first voltage applying arrangement.

When the chlorine generation interval Tc has lapsed after the start of operation in the purification mode, the step SC2 proceeds to a step SC4. In the step SC4, a preselected voltage application time Tv is set in the timer 36. The step SC4 is followed by a step SC5 in which the second d.c. voltage EA2 of the reverse polarity is applied between the second and the third electrodes 22 and 27. The application of the second d.c. voltage EA2 of the reverse polarity is continued for the preselected voltage application time Tv. In a step SC6 following the step SC5, judgement is made about whether or not the preselected voltage application time Tv has lapsed from the start of the application of the second d.c. voltage EA2. It is noted here that the reverse polarity refers to a polarity with the fourth electrode 29 acting as the cathode through the first electrode 21 and with the third electrode 27 acting as the anode. By application of the second d.c. voltage EA2 of, for example, 12 V, chlorine (hypochlorous acid (HClO$^-$)) is acceleratively generated from the chlorine ions at the side of the fourth electrode 29 to increase the chlorine concentration. Thus, the chlorine generating operation is effectively performed. On carrying out the step SC5, a combination of the voltage setting circuit 38, the polarity switching circuit 39, and the d.c. power supply 40 is referred to as the second voltage applying arrangement.

Herein, the variation of the chlorine concentration is similar to that described in conjunction with the first embodiment with reference to FIG. 5.

If the chlorine generating operation in the reverse polarity is repeated, for example, ten times, the scales are accumulated on the fourth electrode 29 acting as the cathode. Therefore, in a step SC7 following the step SC6, the number of times N1 of application of the second d.c. voltage EA2 is counted. In a step SC8 following the step SC7, judgement is made about whether or not the number of times N1 is equal to 10. If the number of times N1 is equal to 10, the step SC8 proceeds to a step SC9. In the step SC9, judgement is made about whether or not the water supply valve 13a is closed. When the water supply valve 13a is closed, the step SC9 proceeds to a step SC10 in which judgement is made about whether or not the chlorine generation interval Tc has lapsed. If the chlorine generation interval Tc has not yet lapsed, the step SC10 proceeds to a step SC11 in which the first d.c. voltage EA1 of the standard polarity is applied. On the other hand, when the chlorine generation interval Tc has lapsed, the step SC10 proceeds to a step SC12 in which the third d.c. voltage EA3 of the standard polarity is applied. More particularly, the second d.c. voltage EA2 is changed into the third d.c. voltage EA3 by the polarity switching circuit 39. On carrying out the step SC12, a combination of the voltage setting circuit 38, the polarity switching circuit 39, and the d.c. power supply 40 will be referred to as a third voltage applying arrangement which is for applying the third d.c. voltage EA3 between the fourth electrode 29 and the third electrode 27 so that they act as the anode and the cathode, respectively.

The step SC12 is followed by a step SC13 in which judgement is made about whether or not a preselected voltage application time Tv has lapsed from the start of application of the third voltage EA3. If the preselected voltage application time Tv has lapsed, the step SC13 proceeds to a step SC14 in which the number of times N2 of application of the third d.c. voltage EA3 of the standard polarity is counted. The step SC14 is followed by a step SC15. In the step SC15, judgement is made about whether or not the number of times N2 is equal to 5, for example. When the number of times N2 becomes equal to 5, the step SC15 returns to the step SC2. Otherwise, the step SC15 returns to the step SC9. Thus, the unfavorable scales accumulated on the fourth electrode 29 are removed.

In the third embodiment described above, the number of times N1 of application of the second d.c. voltage EA2 of the reverse polarity and the number of times N2 of application of the third d.c. voltage EA3 of the standard polarity are equal to 10 and 5, respectively. Thus, the number of times N1 of the second d.c. voltage EA2 is greater than the number of times N2 of the third d.c. voltage EA3. This is because the scales are adhered and accumulated onto the third electrode 27 through the bacteriostatic operation in which the first d.c. voltage EA1 of the standard polarity is applied. Taking this into consideration, the number of times N1 of the second d.c. voltage EA2 is increased to effectively remove the unfavorable scales from the third electrode 27. Although each of the second and the third d.c. voltages EA2 and EA3 is controlled to have a high voltage value kept constant, it is applied between the first and the third electrodes 21 and 27 to have a current value controllably kept constant, for example, at 0.4 A.

According to the third embodiment described above, chlorine can be generated in each of the reverse polarity and the standard polarity. It is therefore possible to reliably remove the scales on the third and the fourth electrodes 27 and 29 and to assure stable bacteriostatic and chlorine generating functions for a long period of time.

The fourth electrode 29 is arranged inside of the adsorber portion 20 and chlorine is generated between the third and the fourth electrodes 27 and 29. With this structure, it is possible to prevent the adsorber portion 20 of activated carbon from being adversely affected by chlorine thus generated. Thus, the adsorber portion 20 is prevented from being deteriorated.

Figure 12:
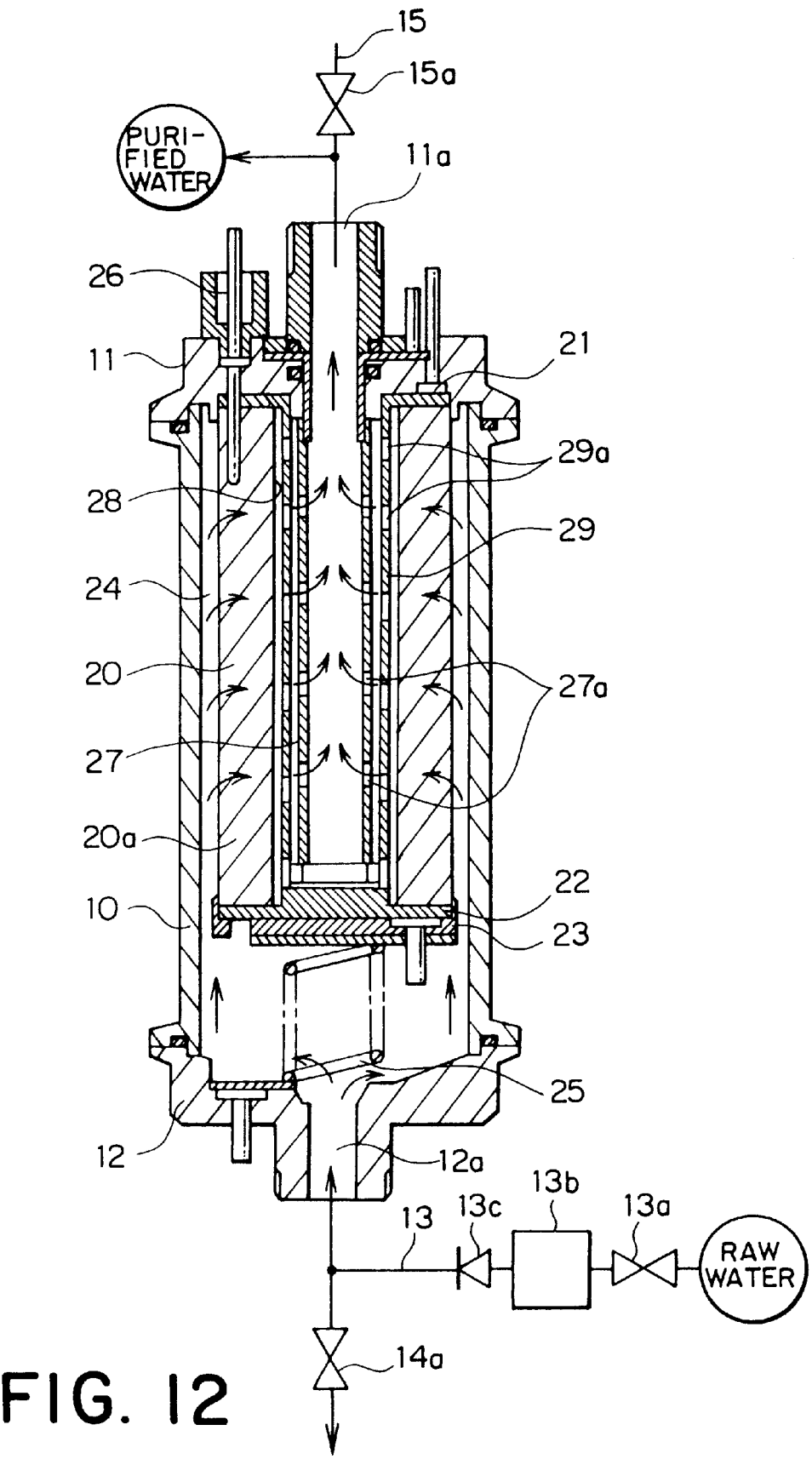
FIG. 12 is a sectional view of a water purification system according to a fourth embodiment of this invention.

Referring to FIG. 12, the description will be made as regards a water purification system according to a fourth embodiment of this invention. Similar parts are designated by like reference numerals.

In the water purification system of the fourth embodiment, the fourth electrode 29 is cylindrical and is separated from the inner peripheral surface of the activated carbon fiber portion 20a to have a circular space 28 left therebetween. Each of the water passage holes 29a of the fourth electrode 29 is formed at a position which disagree with that of each of the water passage holes 27a of the third electrode 27 in a radial direction of the adsorber portion 20.

While the present invention has thus far been described in conjunction with a few embodiments thereof, it will readily be possible for those skilled in the art to put this invention into practice in various other manners. For example, the third and the fourth electrodes may comprise a combination of two semicylindrical electrodes. The water passage holes may be any shape other than a circular shape illustrated in FIG. 9. Use may be made of a different valve open signal for a valve (not shown) arranged at a terminating end (tap). If the water purification system is installed in an automatic vending machine, a beverage vending signal from a beverage vending switch of the automatic vending machine can be used. Furthermore, a flow rate sensor may be arranged downstream of the water purification system to detect a flow rate of the purified water. In this event, a flow rate detection signal from the flow rate sensor can be used. Alternatively, a pressure sensor may be arranged downstream of the water purification system to detect a flow pressure of the purified water. In this event, a pressure detection signal from the pressure sensor can be used.

What is claimed is:

1. A method for purifying raw water, comprising the steps of:

positioning a conductive adsorber portion having a primary electrode opposite to the conductive adsorber portion with a particular space left therebetween in a flow of said raw water;

applying a first d.c. voltage to said conductive adsorber portion and said primary electrode so that said conductive adsorber portion and said primary electrode act as an anode and a cathode, respectively, said first d.c. voltage making said conductive adsorber portion purify said raw water; and applying a second d.c. voltage greater than said first d.c. voltage to said conductive adsorber portion and said primary electrode to accelerate generation of chlorine from said raw water.

2. The method of purifying raw water of claim 1, further including the step of automatically switching between applying the first and second d.c. voltages.

3. A water purification system for purifying raw water, comprising:

a conductive adsorber portion placed in a flow of said raw water;

a primary electrode opposite to said conductive adsorber portion in said flow of the raw water with a particular space left therebetween;

first voltage applying means connected to said conductive adsorber portion and said primary electrode for applying a first d.c. voltage between said conductive adsorber portion and said primary electrode so that said conductive adsorber portion and said primary electrode act as an anode and a cathode, respectively, said first d.c. voltage making said conductive adsorber portion purify said raw water;

second voltage applying means connected to said conductive adsorber portion and said primary electrode for applying a second d.c. voltage between said conductive adsorber portion and said primary electrode, said second d.c. voltage being higher than said first d.c. voltage to accelerate generation of chlorine from said raw water; and control means connected to said first and said second voltage applying means for energizing said first and said second voltage applying means by turns during a particular time duration when said flow of the raw water is interrupted.

4. A water purification system as claimed in claim 3, further comprising a timer for determining a first and a second time duration in said particular time duration, said control means comprising:

a control unit connected to said timer and said first voltage applying means for energizing said first voltage applying means during said first time duration; and said control unit connected to said timer and said second voltage applying means for energizing said second voltage applying means during said second time duration.

5. A water purification system for purifying raw water, comprising:

a conductive adsorber portion placed in a flow of said raw water;

a primary electrode opposite to said conductive adsorber portion in said flow of the raw water with a particular space left therebetween;

first voltage applying means connected to said conductive adsorber portion and said primary electrode for applying a first d.c. voltage between said conductive adsorber portion and said primary electrode so that said conductive adsorber portion and said primary electrode act as an anode and a cathode, respectively, said first d.c. voltage making said conductive adsorber portion purify said raw water;

second voltage applying means connected to said conductive adsorber portion and said primary electrode for applying a second d.c. voltage between said conductive adsorber portion and said primary electrode, said second d.c. voltage being higher than said first d.c. voltage to accelerate generation of chlorine from said raw water; and control means connected to said first and said second voltage applying means for energizing said first voltage applying means during interruption of said flow of the raw water and for energizing said second voltage applying means during continuation of said flow of the raw water.

6. A water purification system for purifying raw water, comprising:

a conductive adsorber portion placed in a flow of said raw water and having an activated carbon fiber portion formed by activated carbon fiber having conductivity and a supplementary electrode connected to said activated carbon fiber portion;

a primary electrode opposite to said conductive adsorber portion in said flow of the raw water to face said supplementary electrode so that a particular space is left between said primary and said supplementary electrodes;

first voltage applying means connected to said conductive adsorber portion and said primary electrode for applying a first d.c. voltage between said conductive adsorber portion and said primary electrode so that said conductive adsorber portion and said primary electrode act as an anode and a cathode, respectively, said first d.c. voltage making said conductive adsorber portion purify said raw water; and second voltage applying means connected to said conductive adsorber portion and said primary electrode for applying a second d.c. voltage between said conductive adsorber portion and said primary electrode, said second d.c. voltage being higher than said first d.c. voltage to accelerate generation of chlorine from said raw water.

7. A water purification system as claimed in claim 6, wherein said activated carbon fiber portion is formed in a cylindrical shape to have axial ends opposite to each other and an inner peripheral surface extending between said axial ends and defining a hollow space, said primary electrode being placed in said hollow space so that said particular space is left between said inner peripheral surface and said primary electrode, said supplementary electrode being placed in said particular space with a gap left between said primary and said supplementary electrodes.

8. A water purification system as claimed in claim 7, wherein said supplementary electrode is cylindrical and is in close contact with said inner peripheral surface of the activated carbon fiber portion.

9. A water purification system as claimed in claim 7, wherein said supplementary electrode is cylindrical and is separated from said inner peripheral surface of the activated carbon fiber portion.

10. A water purification system as claimed in claim 7, wherein said supplementary electrode extends on one of said axial ends of the activated carbon fiber portion.

11. A water purification system for purifying raw water, comprising:

a conductive adsorber portion placed in a flow of said raw water;

a primary electrode opposite to said conductive adsorber portion in said flow of the raw water with a particular space left therebetween;

first voltage applying means connected to said conductive adsorber portion and said primary electrode for applying a first d.c. voltage between said conductive adsorber portion and said primary electrode so that said conductive adsorber portion and said primary electrode act as an anode and a cathode, respectively, said first d.c. voltage making said conductive adsorber portion purify said raw water;

second voltage applying means connected to said conductive adsorber portion and said primary electrode for applying a second d.c. voltage between said conductive adsorber portion and said primary electrode, said second d.c. voltage being higher than said first d.c. voltage to accelerate generation of chlorine from said raw water; and means for automatically switching between said first and second d.c. voltage.

12. A water purification system as claimed in claim 11, further comprising polarity determining means connected to said second voltage applying means for determining a polarity of said second d.c. voltage so that said conductive adsorber portion and said primary electrode act as said cathode and said anode, respectively.

13. A water purification system as claimed in claim 12, further comprising third voltage applying means connected to said conductive adsorber portion and said primary electrode for applying a third d.c. voltage between said conductive adsorber portion and said primary electrode so that said conductive adsorber portion and said primary electrode act as said anode and said cathode, respectively, said third d.c. voltage being higher than said first d.c. voltage level; and said means for automatically switching between said first and second d.c. voltage further includes means for automatically switching between said first, second, and third d.c. voltages.

14. A water purification system as claimed in claim 12, further comprising:

signal producing means for producing a particular signal in relation to said flow of the raw water; and means connected to said signal producing means and said polarity determining means for controlling operation of said polarity determining means in response to said particular signal.

15. A water purification system as claimed in claim 11, wherein said primary electrode comprises a titanium base coated with a material selected from the group consisting of platinum, a combination of platinum and iridium, carbon, and carbon-mixed resin.

16. A water purification system as claimed in claim 11, further comprising:

signal producing means for producing a particular signal in relation to said flow of the raw water; and means connected to said signal producing means, said first voltage applying means, and said second voltage applying means for controlling operation of said first and said second voltage applying means in response to said particular signal.

17. A water purification system as claimed in claim 11, wherein said conductive adsorber portion is formed in a cylindrical shape to have axial ends opposite to each other and an inner peripheral surface extending between said axial ends and defining a hollow space, said primary electrode being placed in said hollow space so that said particular space is left between said inner peripheral surface and said primary electrode.

* * * * *